(12) United States Patent
Ebert et al.

(10) Patent No.: US 9,592,635 B2
(45) Date of Patent: Mar. 14, 2017

(54) METHOD FOR THE CONSTRUCTION OF A SHAPED BODY

(71) Applicants: Ivoclar Vivadent AG, Schaan (LI); Technische Universitat Wien, Vienna (AT)

(72) Inventors: Jorg Ebert, Buchs (CH); Wolfgang Wachter, Schaan (LI); Gottfried Rohner, Alstatten (CH); Jurgen Stampfl, Vienna (AT)

(73) Assignees: Ivoclar Vivadent AG, Schaan (LI); Technische Universität Wien, Vienna (AT)

( * ) Notice: Subject to any disclaimer, the term of this patent is extended or adjusted under 35 U.S.C. 154(b) by 161 days.

(21) Appl. No.: 14/404,984

(22) PCT Filed: Jun. 4, 2013

(86) PCT No.: PCT/EP2013/061449
§ 371 (c)(1),
(2) Date: Dec. 2, 2014

(87) PCT Pub. No.: WO2013/182547
PCT Pub. Date: Dec. 12, 2013

(65) Prior Publication Data
US 2015/0131074 A1    May 14, 2015

(30) Foreign Application Priority Data

Jun. 4, 2012 (EP) ..................................... 12170721

(51) Int. Cl.
*B29C 35/08*    (2006.01)
*B29C 41/02*    (2006.01)
(Continued)

(52) U.S. Cl.
CPC ........ *B29C 67/0051* (2013.01); *B29C 41/042* (2013.01); *B29C 41/045* (2013.01);
(Continued)

(58) Field of Classification Search
CPC ......... B29C 35/08; B29C 41/02; B29C 41/04; B29C 41/042; B29C 41/045; B29C 41/047;
(Continued)

(56) References Cited

U.S. PATENT DOCUMENTS 5,088,047 A * 2/1992 Bynum ............... B29C 67/0074
264/401 X
5,677,107 A    10/1997 Neckers
(Continued)

FOREIGN PATENT DOCUMENTS

DE    69807236 T2    4/2003
DE    60310600 T2    11/2007
(Continued)

*Primary Examiner* — Leo B Tentoni
(74) *Attorney, Agent, or Firm* — Ann M. Knab; Thad McMurray

(57) ABSTRACT

The invention relates to a method for the construction of a shaped body from photopolymerizable material by using lithography-based generative production (rapid prototyping), in which a layer of liquid photopolymerizable material is defined on a production platform (1, 2, 3, 4), the layer is polymerized in an exposure region having a predetermined contour by exposure, a further layer of photopolymerizable material is defined on the polymerized layer, the layer defined last is polymerized by exposure in an exposure region having a predetermined contour for the layer defined last, and the latter two steps are repeated until a shaped body having a predetermined shape has been formed by the sequence of cured layers with contours predetermined layer by layer, wherein ink is applied onto at least one layer inside the predetermined contour, wherein the production platform
(Continued)

Figure 1:
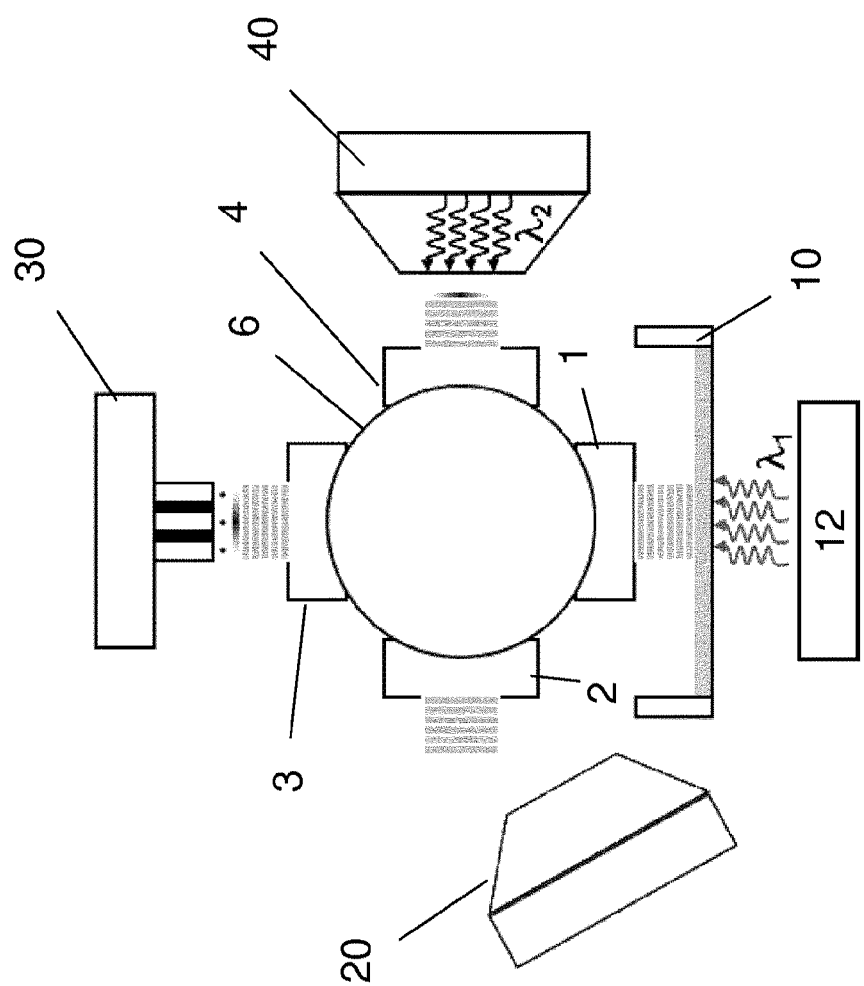

is suspended moveably and wherein the production platform is brought, after the polymerization of a layer in a processing station for polymerizing a layer, by movement to an ink application station as a further processing station in which ink is applied position-selectively to the layer formed last, after which the production platform is moved again to the processing station for polymerizing a further layer, characterized in that the movement of the production platform between various processing stations is carried out by rotating a drum-shaped carrier which holds the production platform on its circumference, around a horizontal or vertical axis of rotation, wherein the processing stations are disposed distributed around the axis of rotation of the drum shaped carrier.

17 Claims, 6 Drawing Sheets

(51) Int. Cl.
   *B41M 1/26* (2006.01)
   *B29C 67/00* (2006.01)
   *B29C 41/04* (2006.01)
   *B29L 31/00* (2006.01)

(52) U.S. Cl.
   CPC .......... *B29C 41/047* (2013.01); *B29C 67/007* (2013.01); *B29C 67/0062* (2013.01); *B29C 67/0066* (2013.01); *B29K 2995/002* (2013.01); *B29L 2031/7536* (2013.01)

(58) Field of Classification Search
   CPC ............ B29C 67/0051; B29C 67/0062; B29C 67/0066; B29C 67/007; B29C 67/0085; B29C 67/0088; B29C 67/0092; B29C 67/0096; B29C 71/04; B41M 1/26
   USPC .......... 264/132, 297.1, 297.8, 310, 401, 482, 264/494, 496; 101/492
   See application file for complete search history.

(56) References Cited

U.S. PATENT DOCUMENTS

| | | |
|---|---|---|
| 6,403,002 B1 | 6/2002 | van der Geest |
| 8,623,264 B2 | 1/2014 | Rohner et al. |
| 2006/0173541 A1 | 8/2006 | Friel |
| 2008/0109102 A1* | 5/2008 | Sutcliffe ............ B29C 67/0081 700/119 |
| 2008/0171284 A1 | 7/2008 | Hull et al. |
| 2010/0291304 A1* | 11/2010 | Becker .................... H05K 3/00 427/355 |
| 2011/0309554 A1 | 12/2011 | Liska et al. |
| 2012/0130530 A1 | 5/2012 | Yasukochi |

FOREIGN PATENT DOCUMENTS

| | | |
|---|---|---|
| EP | 1314540 A1 | 5/2003 |
| EP | 2199065 A1 | 6/2010 |
| EP | 2455211 A2 | 5/2012 |
| WO | 90/03893 A1 | 4/1990 |
| WO | 98/28124 A2 | 7/1998 |
| WO | 2004/037520 A2 | 5/2004 |
| WO | 2004/106041 A2 | 12/2004 |
| WO | 2010/045950 A1 | 4/2010 |
| WO | 2010/045951 A1 | 4/2010 |

\* cited by examiner

METHOD FOR THE CONSTRUCTION OF A SHAPED BODY

CROSS-REFERENCE TO RELATED APPLICATIONS

This application is a National Stage application of International patent application PCT/EP2013/061449 filed on Jun. 4, 2013, which claims priority to European patent application No. 12170721.0 filed on Jun. 4, 2012, the disclosures of which are incorporated herein by reference in their entirety.

The invention relates to a method for the construction of a shaped body from liquid photopolymerizable material by using lithography-based generative production (rapid prototyping), in which a layer of viscous liquid material is defined on a production platform, the layer is polymerized in an exposure region having a predetermined contour by exposure, a further layer of photopolymerizable material is defined on the polymerized layer, the layer defined last is polymerized by exposure in an exposure region having a predetermined contour for the layer defined last, and the latter two steps are repeated until a shaped body having a predetermined shape has been formed by the sequence of cured layers with contours predetermined layer by layer, wherein ink is applied onto at least one layer inside the predetermined contour, wherein the production platform is suspended moveably and wherein the production platform is brought after the polymerization of a layer in a processing station for polymerizing a layer by movement to an ink application station as a further processing station in which ink is applied position-selectively to the layer formed last, after which the production platform is moved again to the processing station for polymerizing a further layer.

A method for forming a shaped body is known, for example, from WO 2010/045950 A1, which relates in particular to the construction of dental restorations from liquid photopolymerizable materials, which may have a high viscosity. In the known method, a construction platform is held vertically movably above a tank bottom, which is formed so as to transmit light. Below the tank bottom, there is an exposure unit. The production platform is first lowered into the photopolymerizable material until only a layer of photopolymerizable material with the desired layer thickness remains between the production platform and the tank bottom. This layer is subsequently exposed with a predetermined contour by the exposure unit, and thereby cured. After the production platform has been raised, photopolymerizable material is replenished from the surroundings and the production platform is lowered again, the lowering being controlled in such a way that a layer with the desired thickness is defined between the layer formed last and the tank bottom. The latter two steps are then repeated until a shaped body having the desired shape has been produced by the successive curing of layers each with a predetermined contour.

DE 698 07 236 T2 describes the production of shaping bodies, materials in powder form being applied in layers and a liquid being applied position-selectively as a binder. The liquid, which is applied onto each layer of finely powdered material, is preferably applied in the form of one or more fine droplet jets. It is furthermore mentioned that the liquid is applied in the form of a multiplicity of fine droplet jets, the liquids in the different jets having different colors. This can be done by using an inkjet printer which is known per se. Here, the binder is thus simultaneously applied position-selectively with the desired color. Similar methods are described in DE 697 16 946 T3 and DE 603 10 600 T2.

The methods described above belong to 3D printing techniques (powder bed). Although the introduction of colored binder into a powder bed leads to colored components, their properties are nevertheless unsatisfactory in various regards. In 3D printing techniques, the granules are colored and/or the powder surfaces are coated. In both cases, capillary forces lead to uncontrolled penetration and running of the ink, so that the coloration does not remain position-selective. Coloration is thus always associated here with running of the ink due to the properties of a loose powder bed. The final product of 3D printing techniques is always a porous green body which, for example when using ceramic particles, cannot be sintered to form a dense structure with corresponding properties. Here, only additional infiltration steps are suitable, which can potentially lead to further "blurring" of the colored bodies.

From EP 2 455 211 A2 a method according to the preamble of claim 1 is known in which successive layers of photopolymerizable material are solidified by light exposure. After solidification of a layer the shaped body to be generated is moved from the exposure station to an ink application station in which ink is selectively applied to the last layer. This moving is achieved by a linear, horizontal movement by which the shaped body is moved back and forth between the spaced apart processing stations.

It is an object of the present invention to provide a method for the layered construction of a shaped body from liquid photopolymerizable material, which can be constructed with a desired position-dependent coloration, wherein the processing steps during construction should be suitable for being carried out in a spatially compact arrangement and in a time efficient manner which in principle permits parallel processing of several shaped bodies. In particular the method should be suitable for being carried out as a method for forming shaped bodies which may serve as dental restorations.

This object is achieved by the method having the features of patent claim 1. Advantageous embodiments of the invention are described in the dependent claims.

According to the invention the movement of the production platform between various processing stations is carried out by rotating a drum-shaped carrier which holds the production platform on its circumference, around a horizontal or vertical axis of rotation, wherein the processing stations are disposed distributed around the axis of rotation of the drum-shaped carrier. On the one hand this permits to carry out the method in a turret mechanism in a compact arrangement, since two (or more) processing stations to be passed through sequentially may be disposed distributed in circumferential direction around the drum-shaped carrier, and not disposed linearly one after the other. In addition, this in principle permits to dispose several production platforms distributed in a corresponding manner around the circumference of the drum-shaped carrier, wherein in the production platforms may then be processed in parallel in the processing stations.

Preferably the application of the ink is carried out with varying colors with predetermined position dependency inside the predetermined position dependency inside the predetermined contour.

In a preferred embodiment, the ink is applied onto a layer after polymerization of the latter and before the application of a further layer. Advantages of printing on an already polymerized layer reside in the control over the spreading of drops and over the wetting behavior on the polymerized surface. After possible drying or fixing of the applied coloring components such as color pigments which may be dispersed or suspended, or dyes which may be dissolved, both referred to below as ink, they remain in position after their curing when immersed again in the photopolymerizable material and are bound by polymerization of the next layer.

As an alternative, the ink application onto a defined layer of photopolymerizable material is carried out before curing of the latter. Preferably, the applied ink layer is fixed if necessary, which is carried out by exposure in the case of suspensions and solutions in photopolymerizable material and by solvent evaporation in the case of suspensions of color pigments or solution of dyes in solvents. Since this fixing or curing step preferably follows on directly from the application step, the color distribution is preserved without significant diffusion or spreading of the applied color distribution. In this embodiment as well, after the solidification of a layer it is preferable for unsolidified coloring material possibly still adhering to be removed in a suitable cleaning step, for example by suction or blowing.

The ink application may be carried out directly onto the layer by a color printer, for example an inkjet printer. The ink may also be applied by passing through a series of successively arranged nozzles, or printing heads each comprising at least one nozzle, in which case different colors are assigned to the nozzles or printing heads.

The application of the ink may alternatively be carried out indirectly by a sheet transfer method, in which the ink is first applied position-dependently onto a sheet and then transferred from there onto the layer to be colored. The transfer may, for example, be carried out by adhesion or using an ink fixing station with fixing by exposure through the sheet.

Preferably, the photopolymerizable material is polymerized on the lower side of the production platform by exposure from below through a transparent tank bottom. The production platform is raised relative to the tank bottom after each exposure step and photopolymerizable material for defining a further layer is replenished. Preferably, after replenishment of photopolymerizable material, the production platform, with the layers formed thereon if they exist, is lowered again into the replenished photopolymerizable material in such a way that a layer of photopolymerizable material having a predetermined thickness is defined by adjusting the distance of the layer cured last above the tank bottom. In this embodiment it is particularly preferred to have the axis of rotation disposed horizontally. In this case the shaped body to be formed on the production platform may be exposed from below, then the carrier may be turned around to the ink application station where it is printed on from above, in case the ink application station is disposed opposite, turned by 180° around the axis of rotation of the drum-shaped carrier.

Preferably, the production platform is brought after the polymerization of a layer by rotating the drum-shaped carrier to a cleaning station as a next processing station in which excess photopolymerizable material, which was not cured in the last exposure step, is removed. Subsequently, the production platform is moved by rotating the drum-shaped carrier to an ink application station in which ink is applied position-selectively to the layer formed last.

Preferably, the production platform is transferred after the ink application in the ink application station to an ink fixing station as next processing station by rotating the drum-shaped carrier in which ink fixing station the applied ink is fixed by solidification, before the production platform is moved again to the processing station for polymerizing a layer where a further layer of photopolymerizable material is defined and polymerized.

Preferably, the movement of the production platform between two processing stations is carried out by rotating the carrier holding the production platform about its vertical rotation axis, and the movement between two other processing stations is carried out by rotating the production platform through 180° about horizontal rotation axis perpendicular to the vertical rotation axis of the carrier, so that processing is carried out successively from below and from above.

Preferably, a shaped body is respectively constructed on both opposite surfaces of the production platform, and the processing of the two shaped bodies is carried out simultaneously from below and above.

Preferably, a further production platform is suspended rotatably together with the first production platform on the drum-shaped carrier in its circumferential direction spaced from the first production platform in such a way that the further production platform lies in the cleaning or ink application station when the first production platform lies in a station for defining a further layer.

Preferably, a plurality of production platforms are suspended from the drum-shaped carrier while being distributed about the rotation axis, in such a way that when a first production platform lies in front of an exposure unit for polymerization of a further layer, a second production platform lies in the cleaning station, a third production platform lies in the ink application station and a fourth production platform lies in the ink fixing station.

Preferably, the processing of the four resulting shaped bodies on the four production platforms is carried out chronologically in parallel by exposure, cleaning in the cleaning station, ink application in the ink application station and ink curing in the ink fixing station.

There may be cases in which it is not always possible to remove all the adhering monomer residues in a cleaning station contactlessly (for example by suction, blowing). It is therefore preferable to cure, or polymerize, the coloring components with UV light (spectrum 200-410 nm) or to dry the applied ink by solvent evaporation, while the actual construction process takes place using visible light (spectrum 380-780 nm), or vice versa. Corresponding additives, such as absorbers and initiators, are to be selected according to the preferred wavelength.

Preferably, in the region of overhangs, i.e. when the layer currently to be cured protrudes in at least one edge region beyond the last layer previously cured, the region protruding beyond the layer cured last is protected by means of material which absorbs the energy of the exposure wavelength, so that polymerization in the underlying region of the layer cured last is avoided during the exposure of the protruding region.

It is preferred that, when lowering the construction platform with the shaped body part already adhering thereto into the photopolymerizable material in order to define a further layer to be cured, significant material displacement does not take place out of the gap between the layer formed last and the tank bottom, so that unacceptable displacement of material on which ink is already applied does not take place. The layer of photopolymerizable material on the tank bottom should therefore have as accurately as possible the thickness of the layer to be cured even before the coloration, so that no photopolymerizable material needs to be displaced after the ink application and the remaining part of the photopolymerizable material in the tank is not contaminated by displaced dyes. In order to define a layer with a desired layer thickness in this way, a blade or a spin-coating method may be used, so that a layer with exactly the desired layer thickness is produced.

In another embodiment, an indirect sheet transfer method may also be used to provide photopolymerizable material and optionally ink. In this case, a thin film of photopolymerizable material is first applied onto the sheet, for example by means of a blade system. The sheet is transported further and the ink is defined on the surface at an ink application station and optionally fixed by means of an ink fixing station. Subsequently, the colored layer of photopolymerizable material can be transferred onto the construction platform for the layer last cured thereon, and can be cured by exposure.

Figure 3:
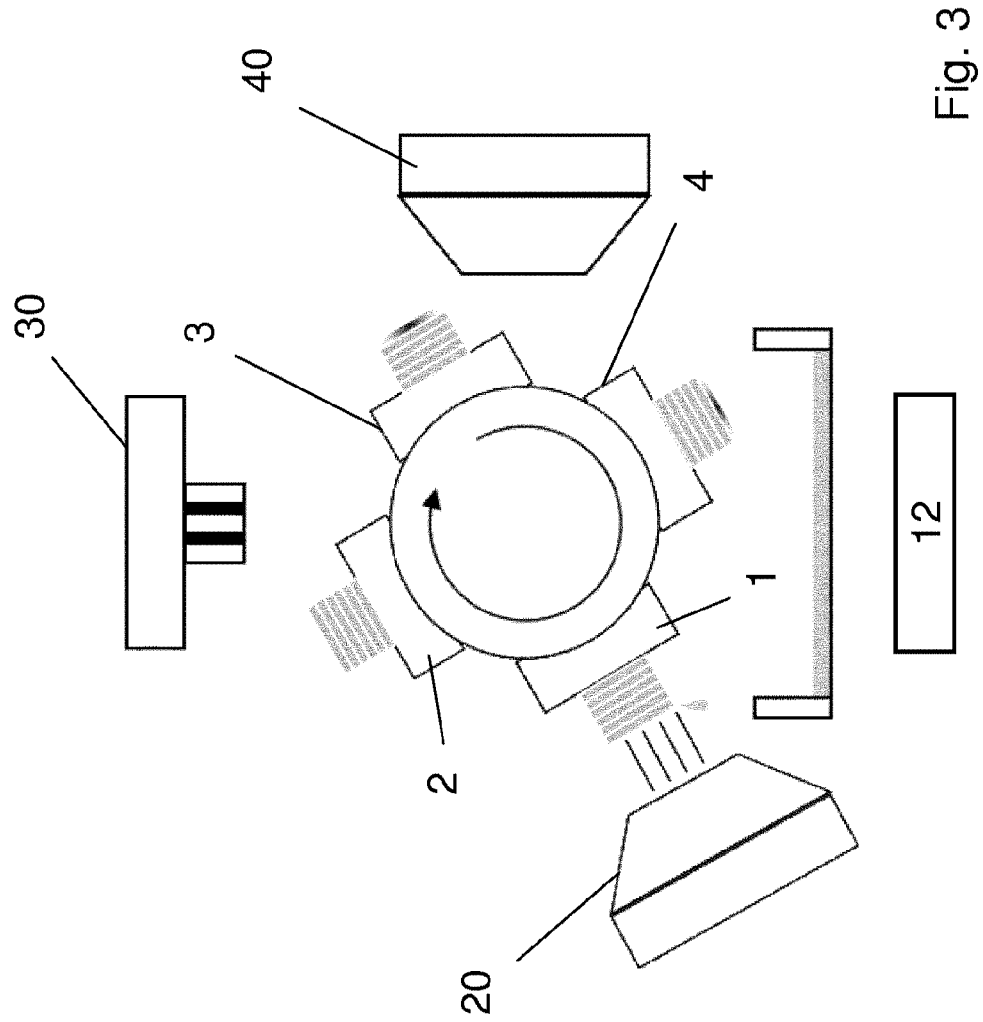
Figure 4:
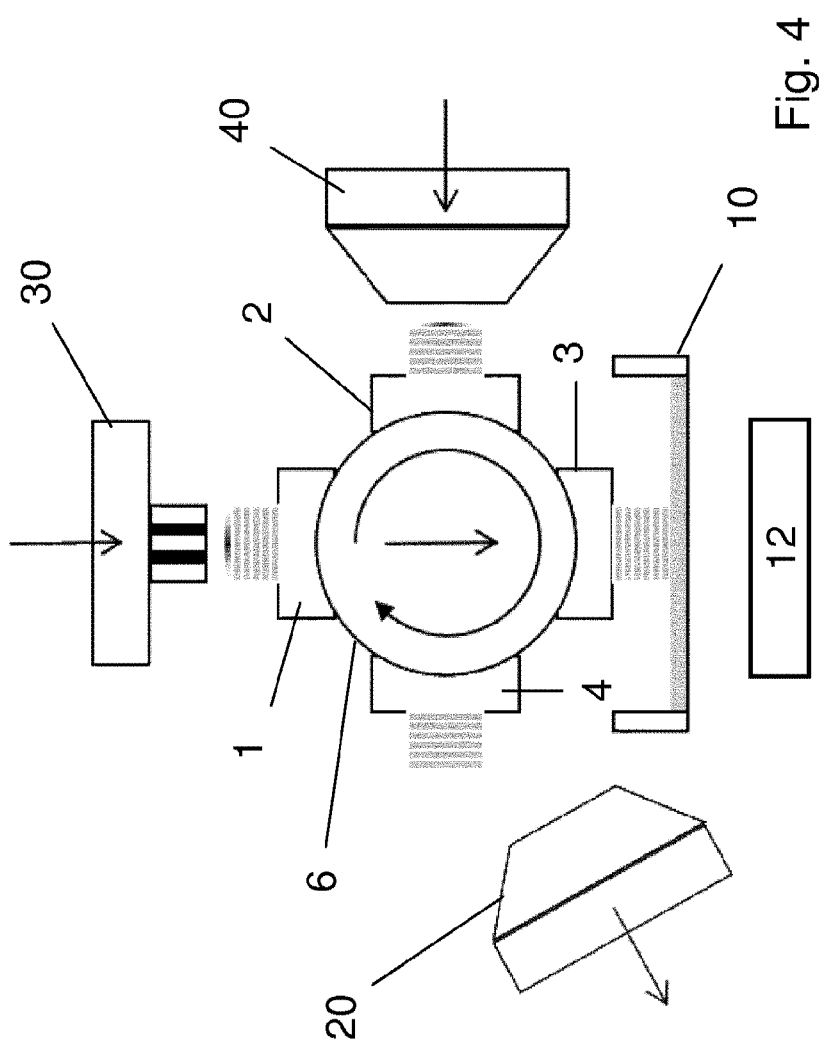
Figure 6:
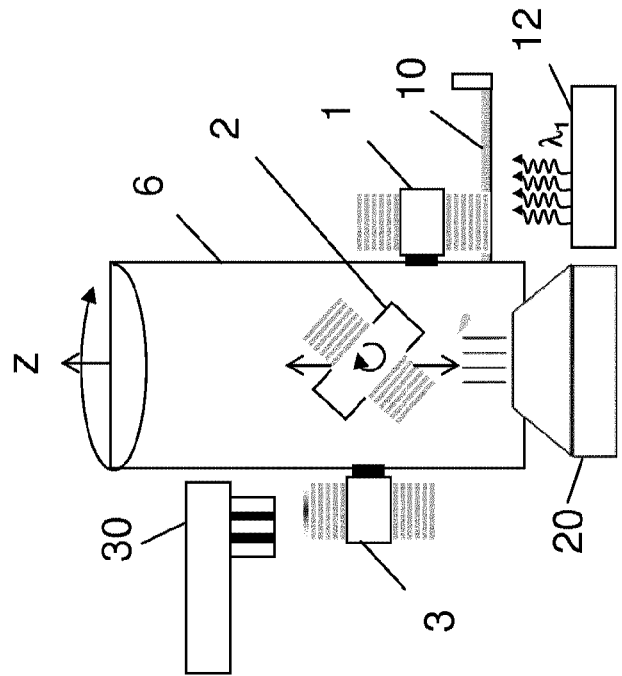
Figure 5:
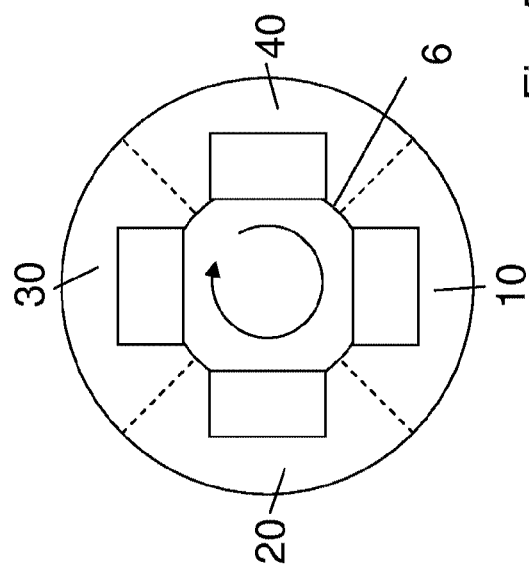
Figure 9:
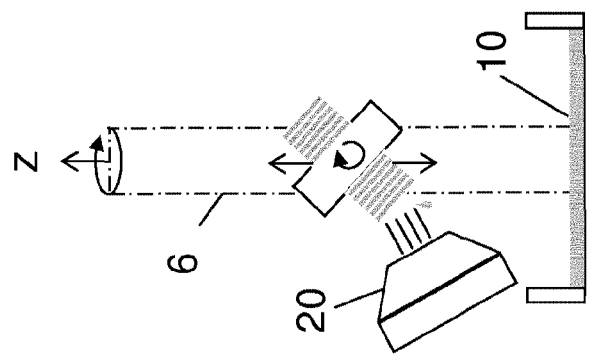
Figure 8:
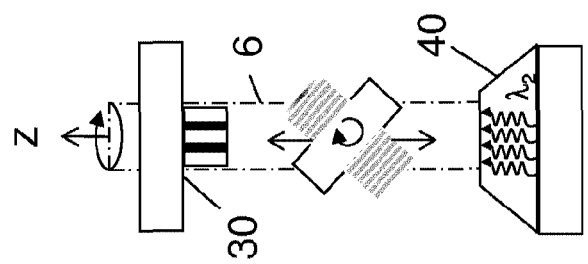
Figure 7:
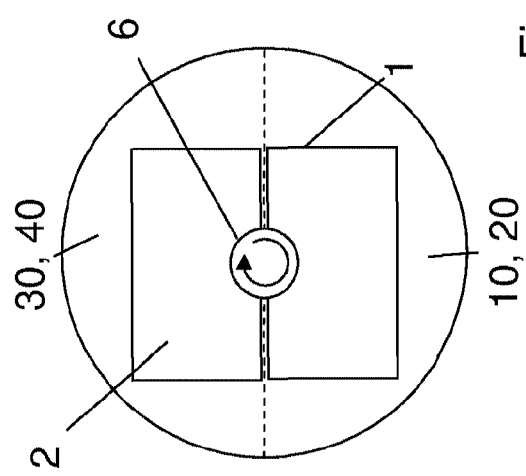

The invention will be explained below with the aid of an exemplary embodiment in the drawings, in which:

FIGS. 1 to 4 show side views of a device for carrying out a method according to the invention in successive method steps, FIGS. 5 and 6 show a device for carrying out an alternative procedure in plan view from above and in side view, FIG. 7 shows a lateral sectional view of a device for carrying out another alternative procedure and FIGS. 8 and 9 show side views of the device in FIG. 7.

First, the procedure for the successive construction of the shaped body will be described, before the further steps in the context of the present invention are discussed. The device represented in FIG. 1 comprises a tank 10, the tank bottom of which, at least in a subregion, is transparent or transmissive for light with a wavelength $\lambda_1$. This subregion of the tank bottom covers at least the extent of the focal plane of an exposure unit 12, which is arranged below the tank bottom. The exposure unit 12 comprises a light source and a light modulator, by which the intensity can be set position-selectively under the control of a control unit, in order to produce an exposure field on the tank bottom with the geometry desired for the layer currently to be formed. As an alternative, a laser may be used in the exposure unit, the light beam of which is controlled by means of a mobile mirror which is controlled by a control unit, or an xy laser plotter which successively scans the exposure field with the desired intensity pattern.

Provided above the tank 10 on the opposite side from the exposure unit 12, there is a construction platform 1 which is supported by a lifting mechanism (not shown) so that it is held in a height-adjustable way above the bottom of the tank 10 in the region of the exposure unit 12.

The tank 10 contains a filling of highly viscous photopolymerizable material. The material level of the filling should be only slightly higher than the desired thickness of the layer to be defined. In order to define a layer of photopolymerizable material, the following procedure is adopted. The production platform 1 is lowered by the lifting mechanism in a controlled way so that (before the first exposure step) its lower side is immersed in the filling of photopolymerizable material and approaches the tank bottom to such an extent that precisely the desired layer thickness remains between the lower side of the production platform 1 and the tank bottom. After the layer thickness has been adjusted, the position-selective exposure desired for this layer is carried out by the exposure unit 12, in order to cure it in the desired shape. After the layer has been formed, the production platform 1 is separated again from the tank 10 by means of the lifting mechanism, either by raising it or by lowering the tank 10. The exposed region is subsequently replenished with photopolymerizable material, in order again to form a layer of photopolymerizable material which is only slightly thicker than the layer thickness desired for the next layer to be formed. Such distribution may, for example, be carried out using a blade or by a so-called spin-coating method, in which a predetermined amount of material is applied in the middle of the tank 10 and the construction platform is then set in rotation so as to spread the photopolymerizable material into a layer with the desired thickness. The material supplied represents the basic color of the corresponding layer. This may be varied during the construction process.

Figure 2:
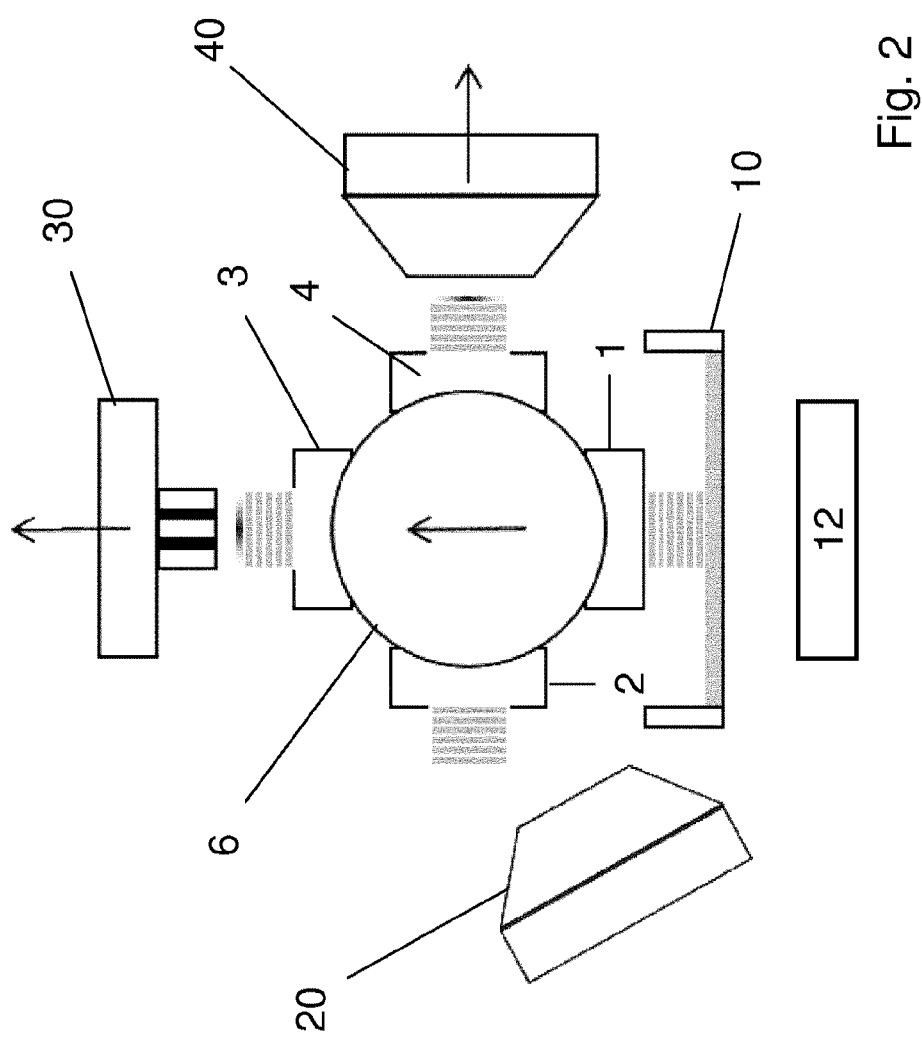

In FIG. 2, the raising of the construction platform after the curing of a current layer is indicated by the straight arrow.

These steps are subsequently repeated several times, with the distance from the lower side of the layer formed last to the tank bottom respectively being adjusted to the desired layer thickness and with the next layer thereupon being cured position-selectively in the desired way.

In the present method according to the invention, however, further intermediate steps in different processing stations take place between the steps of exposing successive layers on the construction platform 1. To this end, the construction platform 1 is suspended rotatably about a horizontal axis from a drum-shaped, cylindrical carrier 6. In the exemplary embodiment represented, the rotation axis of the carrier 6 is perpendicular to the plane of the figure. Further processing stations are arranged around the drum-shaped carrier 6, specifically a cleaning station 20, an ink application station 30 and an ink fixing station 40. The construction platform 1 is delivered successively to said processing stations. In this case, the construction platform 1 with the shaped body part already formed thereon is first conveyed by rotating the carrier 6 to a cleaning station 20, in which adhering residues of unpolymerized material, which has not been cured, are removed. This may for example be carried out mechanically by stripping, or preferably contactlessly by blowing or suction. This processing step is shown in FIG. 3.

After the cleaning, the construction platform 1 is rotated further to the ink application station 30 in which, as shown in FIG. 4, ink is applied position-selectively onto the layer formed last. This may, for example, be done by an ink jet printing method in which a suspension of colored particles in monomer material is applied in the desired pattern. The construction platform 1 is thereupon rotated further to the ink fixing station 40, in which the applied ink is fixed. If the ink is applied in the form of a suspension in photopolymerizable material, the curing may be carried out by exposure. In alternative embodiments, the ink may also be applied as a solution, which is subjected to a heat treatment in the ink fixing station 40 in order to make the solvent evaporate. In principle, all devices for depositing the coloring components in liquid or solid form may be used, for example also pad printing in the case of the sheet transfer method for providing the ink and reception by the platform, or the component surface.

The construction platform 1 is then rotated back into the position shown in FIG. 1, in which a new layer of photopolymerizable material is defined between the layer formed last and the tank bottom, and is polymerized. The described cycle then begins again from the start, and is repeated until the successively formed shaped body has reached the finally desired shape.

In the exemplary embodiment represented, three further construction platforms 2, 3 and 4 are suspended from the drum-shaped carrier 6. In the exemplary embodiment, the construction platforms 1-4 are respectively arranged offset by 90° from one another around the carrier 6. This embodiment makes it possible for processing steps to be carried out in parallel on the construction platforms 1-4 in different processing stations. In the position shown in FIG. 1, a layer with the desired thickness is defined between the last layer formed and the tank bottom on the construction platform 1, and it is cured by exposure to light with the wavelength $\lambda_1$. In parallel therewith, in the ink application station 30, ink is applied onto the last layer formed of the shaped body being produced on the construction platform 3. In parallel therewith, the ink previously applied to the last layer of the shaped body being produced on the construction platform 4 is cured or fixed in the ink fixing station 40 by further exposure with the wavelength $\lambda_2$. In this exemplary embodiment, three successive processing steps are thus carried out simultaneously on three of the construction platforms in different processing stations. In the exemplary embodiment represented, the cleaning station is not offset by 90° relative to the tank 10, so that the cleaning step shown in FIG. 3 for the removal of adhering uncured material is carried out as a separate working step. In principle, however, the cleaning station 20 might also be arranged rotated through 90° relative to the tank bottom, so that the individual process steps could then be carried out simultaneously or in parallel with one another on the construction platforms 1-4.

The tank 10 and the processing stations 20, 30 and 40 can be displaced relative to the construction platforms in a controlled way in the plane of the figure, with the result that their processing positions can respectively be adapted to the stage of the construction process of the shaped body respectively being produced on the construction platforms 1-4.

In the exemplary embodiment represented, the carrier 6 of the construction platforms 1-4 is suspended rotatably about a horizontal axis (perpendicular to the plane of the figure), so as to provide a revolver-like arrangement.

In the exemplary embodiment represented, each layer newly formed on a construction platform by curing is printed on in the desired way by ink application in the ink application station 30. It is not, however, necessary to print on each layer on the shaped body being produced, but instead individual or multiple layers may also be formed without ink application The ink application may also be used for a further purpose, specifically when the shaped body to be formed comprises overhangs. Here, an overhang refers to the situation in which a layer currently to be formed protrudes in at least one direction beyond the underlying cured layer. In this case, in the regions where overhangs of the next layer to be formed are created, the layer defined last may be printed on in these regions so that these regions are covered and, during the exposure of the next, protruding layer to be formed, no polymerization of the underlying layer formed last can take place in the region of the overhangs since it is covered by the applied ink.

FIG. 5 shows a plan view from above of a device suitable for carrying out an alternative procedure. The device comprises a central, drum-shaped carrier 6, which is suspended so that it can be rotated about a vertical rotation axis and from which four construction platforms are suspended at 90° intervals (the rotation axis is perpendicular to the plane of the figure). Around the drum-shaped carrier 6 (above or below the construction platforms) are the four processing stations, likewise at 90° intervals, namely the tank 10 for the layer definition of a photopolymerizable material layer to be polymerized and for exposure and curing of the further layer thus defined, the cleaning station 20, the ink application station 30 and the ink fixing station 40.

FIG. 6 shows a side view of the device from FIG. 5. The construction platforms are suspended from the rotatable drum-shaped carrier 6, which is rotatable about a vertical Z axis in order to move the construction platforms from one processing station to the next by rotation of the central carrier 6. In this embodiment, the construction platforms may additionally be suspended from the central carrier 6 so that they can be rotated about a horizontal axis perpendicular to the Z axis. This embodiment makes it possible respectively to construct two shaped bodies on the two sides of each construction platform, so that there are 8 construction platform surfaces in total, four of which face upward and four which face downward.

In this embodiment, the construction platforms can be rotated through 180° about said horizontal axis on the carrier 6 after a processing step, so that processing can be carried out from above and below. This embodiment may for example be advantageous in the cleaning station 20, since the efflux of excess uncured material can be assisted by gravity.

In the embodiment represented in FIG. 6, the exposure by the exposure unit 12 takes place from below through the tank bottom of the tank 10. The carrier 6 is subsequently rotated through 90° into the cleaning station 20. In the cleaning station, during the exposure step of the construction platform 1, a platform 2 is cleaned, the latter being rotated about the horizontal axis perpendicular to the Z axis so as to make it easier for excess polymerizable material to flow away. During this, the construction platform 3 is printed on from above in the ink application station 30. Naturally, the printing may in principle also be carried out from below. For the specific embodiment, it is then necessary for the control to be adjusted so that the construction platform is delivered to the respective processing station in the correct orientation.

FIGS. 7 to 9 show an alternative embodiment of a device suitable for carrying out a method according to the invention. FIG. 7 shows the device again in plan view from above, while schematic side views are shown in FIGS. 8 and 9. This embodiment differs from the previous ones in that the exposure station is spatially combined with the tank 10 and the cleaning station 20. In a similar way, the ink application station 30 is spatially combined with the ink fixing station 40. As shown in FIG. 7 two construction platforms 1, 2 are arranged diametrically opposite on the central carrier 6. The construction platform 1 is thus in the region of the exposure station 10 and the cleaning station 20, while the construction platform 2 is in the region of the ink application station 30 and the ink fixing station 40. FIG. 8 shows the device in the region of the ink application station 30 and the ink fixing station 40 in plan view. The platform represented is suspended from the central drum-shaped carrier 6 in such a way that it can be rotated about a horizontal axis perpendicular to the Z axis. In this way, one side of the construction platform can first lie facing the ink application station 30 and the ink can be applied onto the uppermost layer of the shaped body on this side of the construction platform. After the ink application, the platform can be rotated through 180°, in such a way that the layer onto which ink has just been applied is then directed downward in the direction of the ink fixing station 40, so that the applied ink can be cured for example by exposure.

FIG. 9 shows the device in the region of the tank 10 and the cleaning station 20. After a layer has been cured on the shaped body above the tank bottom by exposure from below, the construction platform is raised and rotated about the horizontal axis, so that it is directed toward the cleaning station 20. After the cleaning, the carrier 6 is then rotated through 180° again so that, after the cleaning step, the ink application and curing can then be carried out in the ink application station 30 and ink fixing station 40.

In the preferred embodiments described, the exposure is carried out from below and the construction platform is vertically mobile, in order to build layer on layer below the construction platform. Naturally, the present invention may however also be used with exposure from above. Likewise, the printing may be carried out from above or from below depending on the embodiment. The fixing of the ink may be carried out by exposure when using polymerizable ink, or by solvent evaporation when using ink dissolved in solvent.

The invention claimed is:

1. A method for the construction of a shaped body from photopolymerizable material by using lithography-based generative production comprising rapid prototyping in which a layer of liquid photopolymerizable material is defined on a production platform (1, 2, 3, 4), the layer is polymerized in an exposure region having a predetermined contour by exposure, a further layer of photopolymerizable material is defined on the polymerized layer, the layer defined last is polymerized by exposure in an exposure region having a predetermined contour for the layer defined last, and the latter two steps are repeated until a shaped body having a predetermined shape has been formed by the sequence of cured layers with contours predetermined layer by layer, wherein ink is applied onto at least one layer inside the predetermined contour, wherein the production platform is suspended moveably and wherein the production platform is brought, after the polymerization of a layer in a processing station for polymerizing a layer, by movement to an ink application station as a further processing station in which ink is applied position-selectively to the layer formed last, after which the production platform is moved again to the processing station for polymerizing a further layer, characterized in that the movement of the production platform between various processing stations is carried out by rotating a cylindrically-shaped carrier which holds the production platform on its circumference, around a horizontal or vertical axis of rotation, wherein the processing stations are disposed distributed around the axis of rotation of the drum shaped carrier.

2. The method for the construction of a shaped body as claimed in claim 1, wherein the application of the ink is carried out with varying colors with predetermined position dependency inside the predetermined contour.

3. The method for the construction of a shaped body as claimed in claim 1, wherein the application of the ink on a layer is carried out after polymerization of the latter and before the application of a further layer.

4. The method for the construction of a shaped body as claimed in claim 1, wherein the application of the ink is carried out directly onto the layer by a color printer.

5. The method as claimed in claim 1, wherein the application of the ink is carried out indirectly by a sheet transfer method, in which the ink is first applied position-dependently onto a sheet and then transferred from there onto the layer to be colored.

6. The method as claimed in claim 1, wherein the photopolymerizable material is polymerized on the lower side of the production platform by exposure from below through a transparent tank bottom, wherein the production platform is raised relative to the tank bottom after each exposure step and wherein photopolymerizable material for defining a further layer is replenished.

7. The method for the construction of a shaped body as claimed in claim 6, wherein, after replenishment of photopolymerizable material, the production platform, with the layers formed thereon if they exist, is lowered again into the replenished photopolymerizable material in such a way that a layer of photopolymerizable material having a predetermined thickness is defined by adjusting the distance of the layer cured last above the tank bottom.

8. The method for the construction of a shaped body as claimed in claim 1, wherein the production platform is first brought, after the polymerization of a layer in the processing station for applying and polymerizing, by rotating the cylindrically-shaped carrier first to a cleaning station (20) in which excess photopolymerizable material, which was not cured in the last exposure step, is removed before it is moved to the ink application station (30) as a next processing station.

9. The method for the construction of a shaped body as claimed in claim 8, wherein the production platform is after the ink application in the ink application station (30) transferred by rotation of the cylindrically-shaped carrier to an ink fixing station (40) in which the applied ink is fixed by solidification, before the production platform is rotated again to the processing station for applying and polymerizing a layer where a further layer of photopolymerizable material is defined and polymerized.

10. The method as claimed in claim 8, wherein the movement of the production platform between two processing stations is carried out by rotating the carrier (6) holding the production platform about its vertical rotation axis, and the movement between two other processing stations is carried out by rotating the production platform through 180° about a suspension from the carrier (6) with a horizontal rotation axis perpendicular to the vertical rotation axis of the carrier (6), so that processing is carried out successively with an orientation downward and upward.

11. The method as claimed in claim 10, wherein a shaped body is respectively constructed on both opposite surfaces of the production platform, and wherein the processing of the two shaped bodies is carried out simultaneously from below and above.

12. The method as claimed in claim 10, wherein a further production platform is suspended rotatably together with the first production platform from the cylindrically-shaped carrier spaced apart in circumferential direction from the first production platform, in such a way that the further production platform lies in the cleaning or ink application station when the first production platform lies in a station for defining a further layer.

13. The method as claimed in claim 9, wherein a plurality of production platforms are suspended from the cylindrically-shaped carrier (6) while being circumferentially about the rotation axis in such a way that when a first production platform (1) lies in the processing station for polymerization of a further layer in front of an exposure unit, a second production platform (2) lies in the cleaning station (20) as processing station, a third production platform (3) lies in the ink application station (30) as processing station and a fourth production platform (4) lies in the ink fixing station (40).

14. The method as claimed in claim 13, wherein the processing of the four resulting shaped bodies on the four production platforms is carried out chronologically in parallel by exposure, by cleaning in the cleaning station (20), by ink application in the ink application station (30) and by ink curing in the ink fixing station (40).

15. The method as claimed in claim 1, wherein in a region of overhangs where a layer currently to be cured protrudes laterally beyond the layer formed last, the protruding region is covered by material which is absorbent in the exposure wavelength range in order to avoid polymerization behind the layer currently to be cured.

16. The method as claimed in claim 1, wherein the photopolymerizable material is brought to a desired height above the tank bottom before the exposure of a further layer, by adjusting the desired layer thickness by a blade or by a spin-coating method, to reduce material displacement when the production platform is being lowered toward the tank bottom in order to define the layer to be cured.

17. The method as claimed in claim 1, wherein for application of a further layer of photopolymerizable material onto the production platform or the layer cured last thereon, an indirect sheet transfer method is used in which a layer of photopolymerizable material is defined with the desired thickness on a sheet and the sheet is transported further in order for the layer defined thereon to be transferred onto the production platform, or the layer cured last thereon, and cured by exposure.

* * * * *